3,640,948
STABILIZED POLYAMIDES
John Ernest Jackson, Pontypool, England, assignor to Imperial Chemical Industries Limited, London, England
No Drawing. Filed Apr. 23, 1969, Ser. No. 818,787
Claims priority, application Great Britain, May 14, 1968, 22,886/68
Int. Cl. C08g *51/56, 51/62*
U.S. Cl. 260—45.75 R                               9 Claims

ABSTRACT OF THE DISCLOSURE

A high molecular weight fiber-forming stabilized polyamide contains 5–100 p.p.m. by weight on the polyamide of phosphorus in the form of a phosphorous acid or a salt thereof and 100–10,000 p.p.m. by weight on the polyamide of a sulfur-containing phenol having the formula OH—$\phi$—S—R where $\phi$ represents a benzene ring. The hydroxyl group is positioned para or ortho to the sulfur atom and R is alkyl, aryl and preferably an identical $\phi$—OH structure as above, located symmetrically about the sulfur atom.

---

The present invention relates to the stabilisation of high molecular weight fibre-forming synthetic linear polyamides or copolyamides against impairment of their properties by the action of heat and oxygen and by light, particularly when said polyamides are pigmented with titanium dioxide.

Synthetic linear polyamides and copolyamides, e.g. polyhexamethylene adipamide, are widely used in the manufacture of textile and other products, for instance yarns and fabrics. Such products are noted for their attractive properties, such as great strength, i.e. high tenacity. Prolonged exposure to light, however, as in the case of curtains hung at windows, gradually impairs the properties of such polymers. In order to stabilise said polymers against light deterioration, small quantities of various manganese salts may be incorporated into the polymer during manufacture, but these often tend to cause discolouration on bleaching. The addition of a reducing phosphorus oxyacid or a salt thereof, called hereinafter a reducing phosphorus compound, reduces such discolouration.

Said polymers are also apt to be discoloured and degraded by heat in the presence of oxygen, for instance, during conventional heat setting processes. Heat stability, with or without manganese present, can be greatly improved by the addition of a suitable phenol e.g. 1,1,3-tris-(1-hydroxy-3-methyl-6-tertbutylphenyl)butane along with a suitable reducing phosphorus compound.

Polymer instability tends to increase with increasing content of many pigments, for instance, with increasing tiania content. Amounts of pigments such as titania, of the order of several percent, may be added in some cases and such instabilty may be come considerably exacerbated.

A free phosphorus acid or an inorganic salt thereof may be employed as the reducing phosphorus compound but inorganic ions have a tendency to promote aggregation of the titania particles and impair the quality of the titania dispersion. Impairment of the titania dispersion clearly has a more disadvantageous effect the higher the amount of titania incorporated in the polymer. Addition of organic reducing phosphorus compounds such as amine salts, on the other hand, while reducing the difficulties associated with dispersion of the titania, may give rise to difficulties in the yarn drawing process, such as formation of undesirable deposits on the apparatus.

Hence it is of considerable advantage to be able to reduce the addition of such reducing phosphorus compounds, both inorganic and organic, to a minimum amount consistent with obtaining the desired effect of such addition.

In practice hitherto it has been found that the said reducing phosphorus compounds must be present in an amount equivalent to approximately 200 p.p.m. of phosphorus in the polymer, or considerably above this figure, for them to exert any appreciable effect. Applicants have now found that the addition of a phenolic antioxidant containing sulphur at a suitable position in its molecule, in conjunction with a reducing phosphorus compound, permits the addition of much smaller amounts of said phosphorus compound, thus overcoming the aforesaid disadvantages, while at the same time, surprisingly, at least preserving the advantages stabilising effect.

The sulphur-cointaining phenols used in the present invention have the general formula OH$\phi$S.R, where $\phi$ represents a benzene ring, with the OH group positioned para- or ortho- to the sulphur atom, and R may be an alkyl or aryl group and preferably an identical $\phi$. OH structure located symmetrically about the S atom. Hydrogen atoms of the benzene ring or rings may be substituted by aryl or alkyl groups such as methyl, ethyl, tertiary butyl and the like; again, if there are two benzene rings, preferably symmetrically about the S atom. Whilst the hydroxyl group or groups may be positioned either para- or ortho- to the sulphur atom in said sulphur containing phenols, para-positioning is preferred.

A further advantage of compositions according to the present invention is that formation of gel, for instance, during melt spinning, such as may occur by degradation of the molten polyamide or copolyamide in the presence of pigments such as carbon black, is hindered. Furthermore the loss of amine ends when, for example, a polyamide fabric is submitted to a process of conventional heat setting, is markedly reduced. This aspect is of particular importance since such loss of amine ends is apt to give rise to stripiness in such a fabric when dyed.

The amounts of phosphorus, sulphur-containing phenol, and manganese (when added), based on the polymer in weight proportion, used in carrying out the present invention, are as follows:

Phosphorus (introduced in the form of a reducing phosphorus compound): 5 to 100 parts per million and preferably between 50 and 100 parts per million.

Sulphur-containing phenol: from 100 to 10,000 p.p.m. and preferably from 400 to 1,000 parts per million.

Manganese (optionally introduced, in the form of an oxide, hydroxide or salt): from 5 to 1,000 parts per million and preferably from 10 to 100 parts per million.

The present invention accordingly comprises in one of its aspects a high molecular weight fibre-forming synthetic polyamide or copolyamide in which there have been incorporated from 5 to 100 parts per million parts by weight on the polyamide of phosphorus in the form of a phosphorous acid or a salt thereof and 100 to 10,000 parts per million by weight on the polyamide of a sulphur-containing phenol having the general formula OH.$\phi$S.R, where $\phi$ represents a benzene ring, with the hydroxyl group positioned para- or ortho- to the sulphur atom, R being an alkyl or aryl group, and preferably an identical $\phi$. OH structure as above located symmetrically about said sulphur atom.

As already indicated, the invention is particularly adapted to polyamides containing titania or other pigments, and is applicable to both acid-stabilised and base-stabilised polyamides.

Conventional adjuvants may also be added to the polyamides at any convenient stage in their manufacture, for instance: dyes, pigments, dyestuff-formers, plasticisers or resins.

The invention includes shaped articles of the above high molecular weight linear polyamides containing phosphorus, a suitable sulphur-containing phenol and optionally manganese, such as, for example, fibres, filaments, yarns, films, fabrics and other textile materials.

The reducing phosphorus acid or salt thereof and the sulphur-containing phenol may be incorporated in the polyamide by addition at any suitable stage in its manufacture. Preferably they are mixed with the polyamide starting materials before the polymerisation commences. Alternatively, they may be added to the finished polyamide, for instance by dusting them on to the polyamide chip prior to its melting. When titania is added, an insoluble manganese salt or a hydroxide or oxide or other compound thereof may, if required, be precipitated previously thereon so as to coat the titania particles.

The stabilising components of the present invention may be added, either separately or in combination, at suitable points in a continuous polymerisation process, such as that carried out in a pipe or coil. In this case the sulphur-containing phenol is preferably added as a solution in aqueous caprolactam and the titania added as a slurry.

Use of the sulphur-containing phenols of the present invention in a continuous polymerisation process presents a surprising advantage in reducing the formation of deposits in the polymerisation apparatus and its appended apparatus, thus permitting operation of such apparatus for long periods.

Examples of the high molecular weight linear polyamides (which expression is to be understood as including copolyamides) are listed below.

POLYAMIDE polyhexamethylene sebacamide
polyhexamethylene adipamide
polyoctamethylene adipamide
polydecamethylene sebacamide
polypentamethylene sebacamide
polydodecamethylene adipamide
poly-epsilon-caprolactam
poly-omega-aminoundecanoic acid
poly-m-xylylene adipamide
polyhexamethylene isophthalamide Copolyamides derived from the following starting materials may also be mentioned:

(1) hexamethylene diammonium adipate and epsilon-caprolactam
(2) hexamethylene diammonium adipate and hexamethylene diammoniumsebacate,
(3) hexamethylenediammoniumadipateandhexamethylenediammoniumisophthalate,
(4) hexamethylene diammonium terephthalate and dodecamethylene diammonium terephthalate,
(5) the salts from hexamethylene diamine, adipic acid and 1,4-diphenyl adipic acid.

Suitable manganese salts, if required, are, for instance the lactate, acetate, formate, stearate, ortho-phosphate and pyrophosphate.

The reducing phosphorous compounds which may be added include ortho - phosphorous, meta - phosphorous, pyro-phosphorous and hypo-phosphorous acids, and also thiophosphorous acids, e.g. dithio-orthophosphorous acid, and their organic and inorganic salts.

Examples of such organic salts are:

hexamethylene diammonium di-hyphophosphite
dimethyl hydrogen orthophosphite
tri-isodecyl orthophosphite
diethanolammonium hypophosphite
triethylammonium hypophosphite
triphenyl orthophosphite
trilauryl trithiophosphite The following examples, in which the parts are parts by weight, are intended to illustrate, but not to limit, the invention.

EXAMPLES 1 AND 2

6.6 nylon was prepared by the conventional method, from hexamethylene diamine and adipic acid, with the addition, at the beginning of polymerisation, of a slurry containing titanium dioxide pre-coated with manganese phosphate. The titanium dioxide was added in such amount that there was approximately 2% of it in the final polymer. Sodium hyrophosphite was also added at the same time in an amount equivalent to 70 parts per million of phosphorus on the polymer produced.

In Example 1 there was further added 0.05% (on polymer) of 1,1,3-tris (1-hydroxy-3-methyl-6-tert·butyl phenyl) butane, a phenol not containing sulphur and which is known to be a very efficient antioxidant for polyamides. In examples 2 there was added 0.5% (on polymer) of bis(2-methyl-4-hydroxy-5-tert·butyl phenol) sulphide.

200 denier, 20-filament yarns were melt spun from the polymers produced in each case and drawn to 70 denier. Before drawing, samples of said yarns, free of finish, were tested for amine end group content (called AEG) and relative viscosity (R.V.) in the conventional manner, as well as for whiteness. The whiteness of the yarn was measured in terms of "b" chromaticity on a Mecco Colormaster Mark V colorimeter, (obtainable from Manufacturers Engineering & Equipment Corporation, Warrington, Pa., U.S.A.) using the rotating dish assembly. The colorimeter was pre-calibrated. Perfect whiteness was denoted by a value of 0.333. The yarns were then heated in air at 220° C. for 30 seconds and the above mentioned tests again carried out.

The results obtained, together with the changes in said properties are shown in the table below.

TABLE 1
EFFECT OF HEATING EXPERIMENTAL YARNS FOR 30 SECONDS AT 220° C.

| Example | Additives | Initial analysis | | Final analysis | | Change in analysis | |
|---|---|---|---|---|---|---|---|
| | | A.E.G., equ./10⁶g. | "b" chromaticity (b) | A.E.G., equ./10⁶g. | "b" chromaticity (b) | $-\Delta$ A.E.G., equ./10⁶g. | $\Delta b$ |
| 1 | 2% titania, 26 p.p.m. Mn, 0.05% 1,1,3-tris (1-hydroxy-3-methyl-6-tert butyl phenyl) butane and 70 p.p.m. P as sodium hypophosphite. | 47.2 | 0.323 | 29.4 | 0.285 | 17.8 | 0.038 |
| 2 | 2% titania, 26 p.p.m. Mn, 0.5% bis (2-methyl-4-hydroxy-5-tert. butyl phenyl) sulphide and 70 p.p.m. P as sodium hypophosphite. | 4.44 | 0.323 | 37.2 | 0 300 | 7.2 | 0.038 0.018 |

It can be seen that with only 70 p.p.m. of phosphorus present the yarn containing bis (2-methyl-4-hydroxy-5-tert. butyl·phenyl) sulphide was very much more stable than the containing 1,1,3-tris (1-hydroxy-3-methyl-6-tert butyl phenyl) butane, even though this compound is well known to be very efficient antioxidant, as aforesaid, and that the "b" chromaticity remained at as high a value as 0.300. With the aforesaid very low phosphorus content there was no trouble with the titania dispersion even though the titania content of the polymer was as high as 2%.

EXAMPLES 3 AND 4

Examples 1 and 2 were repeated using titania with no Mn. present. The results are shown in table 2 below.

not possible to run a trouble-free process for anything like two weeks, owing to deposits forming in the apparatus. Thus, the use of bis (2-methyl-4-hydroxy-5-tert. butyl phenyl) sulphide gave a surprising advantage, permitting operation of the continuous process over long period.

TABLE 2

| Example | Additives | Initial analysis | | Final analysis | | Change in analysis | |
|---|---|---|---|---|---|---|---|
| | | A.E.G., equ./10⁶g. | "b" chromaticity (b) | A.E.G., equ./10⁶g. | "b" chromaticity (b) | $-\Delta$ A.E.G., equ./10⁶g. | $\Delta b$ |
| 1 | 2% TiO₂ (no Mn, 0.05% 1,1,3-tris (1-hydroxy-3-methyl-6-tert.butyl phenyl) butane and 70 p.p.m. P as NaH₂PO₂. | 49.3 | 0.324 | 33.8 | 0.284 | 15.5 | 0.040 |
| 2 | 2% TiO₂ (no Mn,) 0.05% bis (2-methyl-4-hydroxy-5-tert.butyl phenyl) sulphide and 70 p.p.m. P as NaH₂PO₂. | 40.9 | 0.325 | 37.2 | 0.308 | 3.7 | 0.017 |

EXAMPLES 5 and 6

40 denier 13 filament yarn containing 0.3% titania was spun for two weeks at 7.7 lb./hr. from a 10 lb./hr. capacity continuous polymerization apparatus.

Titania was injected as a slurry at the 70% injection point i.e. at a point 70% along the length of the evaporating section previous to the polymerization zone.

In Example 5, bis (2-methyl-4-hydroxy-5-tert butyl phenyl) sulphide was injected as an approximately 1% solution in approximately 50% w./w. aqueous caprolactam at the 30% point, to give a level of approximately 0.05% in the yarn.

50 p.p.m. of phosphorus as hexamethylene diamine hypophosphite were added along with the hexamethylene diamine at the entry to the apparatus.

During the two weeks spinning, extrusion performance was generally good and yarn lustre was well within acceptable limits; the fault rate was only 5 breaks and 1 filament break per 100 lbs. The yarn was drawn on a conventional Rieter drawtwist machine at 3,300 f.p.m. There were no undesirable deposits formed on the drawing apparatus, even after 7 days continuous drawing.

The drawn yarn was tested on a laboratory oxidation testing apparatus, as in Examples 1 and 2, and was shown to have a final b-chromaticity of 0.291.

The procedure of Example 6 was the same as that for Example 5 except that 1,1,3-tris (1-hydroxy-3-methyl-6-tert butyl phenyl) butane was used instead of bis (2-methyl-4-hydroxy-5-tert butyl phenyl) sulphide. In this case the final b chromaticity was only 0.281 and it was

EXAMPLES 7 and 8

Examples 5 and 6 were repeated but with 80 p.p.m. phosphorus. The difference, before and after heating, in results of the oxidation test described in Examples a and 2 are shown in Table 3 below.

TABLE 3

| Example | Additive | $-\Delta$ A.E.G. | $\Delta b$ |
|---|---|---|---|
| 7 | 1,1,3-tris (1-hydroxy-3-methyl-6-tert. butyl phenyl) butane. | 16.4 | 0.046 |
| 8 | Bis (2-methyl-4-hydroxy-5-tert. butyl phenyl) sulphide. | 11.5 | 0.039 |

EXAMPLES 9–25

6.6 nylon was prepared by the conventional method, from hexamethylene diamine and adipic acid, with addition of TiO₂ pigment, various phosphorus compounds and various antioxidants as shown in Table 4. (AFN (2) is a titania coated with an Mn compound, 2% of which introduces 26 p.p.m. Mn into the polymer melt).

The spun yarn was tested for relative viscosity, amine end group content (A.E.G.), carboxyl end group content (C.E.G.) and total end group content (T.E.G.). The T.E.G. is a measure of chain scission and decomposition and is found from a calibration curve with RV. After heating for 30 seconds at 220° C. the yarns were again subjected to the measurements. The differences in the results before and after heating are shown in Table 4.

TABLE 4

Effect of heating undrawn 220/20 denier finish-free yarn for 30 seconds at 220° C.

| Example | Additives | Change in analysis | | | |
|---|---|---|---|---|---|
| | | $-\Delta$ A.E.G., equ./10⁶ g. | $\Delta$ C.E.G., equ./10⁶ g. | $\Delta$ T.E.G. | "b" $\Delta$ chromaticity |
| 7 | 2% AFN (2) TiO₂ | 18.4 | 12 | 94 | 0.045 |
| 8 | 2% AFN (2) TiO₂ plus 75 p.p.m. P as NaH₂PO₂ | 21.2 | 13 | 84 | 0.047 |
| 9 | 2% AFN (2) and 0.05% 2,2,1-methylene bis(4 methyl-6 t. butylphenol) and 75 p.p.m. P as NaH₂PO₂. | 31.5 | 11 | 60 | 0.047 |
| 10 | 2% AFN (2) and 0.05% 1,3,5 trimethyl-2,4,6-tris(3,5 di t. butyl-4 hydroxy benzyl) benzene and 75 p.p.m. P as NaH₂PO₂. | 17.5 | 7 | 92 | 0.047 |
| 11 | 2% AFN (2) and 0.05% 3 methyl-6 t. butylphenol and crotonaldehyde condensate and 75 p.p.m. P as NaH₂PO₂. | 19.2 | 11 | 96 | 0.046 |
| 12 | 2% AFN (2) and 0.025% bis(2 methyl-4-hydroxy-5-t.-butyl phenyl) sulphide and 75 p.p.m. P as NaH₂PO₂. | 14.9 | 10 | 59 | 0.040 |
| 13 | 2% AFN (2) and 0.05% bis(2 methyl-4-hydroxy-5-t.-butyl phenyl) sulphide and 75 p.p.m. P as NaH₂PO₂. | 8.5 | 1 | 11 | 0.025 |
| 14 | 2% AFN (2) and 0.075% bis(2 methyl-4-hydroxy-5-t.-butyl phenyl) sulphide and 75 p.p.m. P as NaH₂PO₂. | 2.1 | 3 | 12 | 0.030 |
| 15 | 2% AFN (2) and 0.1% bis(2 methyl-4-hydroxy-5-t-butyl phenyl) sulphide and 75 p.p.m. P as NaH₂PO₂. | 9.2 | 1 | 7 | 0.031 |
| 16 | 2% AFN (2) and 0.05% bis(2 methyl-4-hydroxy-5-t.-butyl phenyl) sulphide and 75 p.p.m. P as H.M.D. hypophosphite. | 9.2 | −5 | 4 | 0.026 |
| 17 | 2% AFN (2) and 0.05% bis(2 methyl-4-hydroxy-5-t.-butyl phenyl) sulphide and 75 p.p.m. P as Phosclere 310. | 10.2 | 7 | 36 | 0.036 |
| 18 | 2% AFN (2) and 0.05% bis(2 methyl-4-hydroxy-5-t.-butyl phenyl) sulphide and 75 p.p.m. P as Mn(H₂PO₂)₂. | 10.0 | 2 | 16 | 0.027 |
| 19 | 2% AFN (2) and 0.05% bis(2 methyl-4-hydroxy-5-t.-butyl phenyl) sulphide and 75 p.p.m. P as Ba(H₂PO₂)₂. | 10.3 | 1 | 14 | 0.029 |
| 20 | 2% AFN (2) and 0.05% bis(3-t. butyl-4-hydroxy-5-methyl phenyl) sulphide and 75 p.p.m. P as NaH₂PO₂. | 12.0 | 4 | 20 | 0.036 |
| 21 | 2% AFN (2) and 0.05% bis(3 methyl-4-hydroxy 5-t.-butyl benzyl) sulphide and 75 p.p.m. P as NaH₂PO₂. | 16.2 | 8 | 38 | 0.014 |
| 22 | 2% AFN (2) and 0.05% 2,2-thio-bis(4 methyl 6-t. butyl phenol) and 75 p.p.m. P as NaH₂PO₂. | 12.6 | 7 | 40 | 0.035 |
| 23 | 2% AFN (2) and 0.05% 2,2,thio-bis (3 methyl-4,6 di tert. butylphenol) and 75 p.p.m. P as NaH₂PO₂. | 13.2 | 8 | 45 | 0.036 |

It is clear, particularly when the results obtained with 0.05% of the antioxidant are compared, that there was less change in the properties with the yarn containing the antioxidants of the present invention than there was with yarns containing the sulphurless antioxidants or with those containing no antioxidant. A difference of .002 in the value of the "b" chromaticity is visible to the naked eye.

Thus, it is clear that yarns containing the antioxidants of the present invention are more stable than those containing other antioxidants in equivalent amount.

What I claim is:

1. A high molecular weight fibre-forming synthetic polyamide wherein the improvement consists in that there have been incorporated from 5 to 100 parts per million parts by weight on the polyamide of phosphorus in the form of a phosphorous compound selected from the group consisting of phosphorous acid, thiophosphorous acid, hypophosphorous acid, an alkyl or aryl ester of one of said acids, an amine salt of one of said acids and a salt of one of said acids with an alkali metal, alkaline earth metal or manganese, and 100 to 10,000 parts per million by weight on the polyamide of a sulphur-containing phenol having the formula

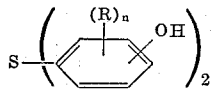

wherein the OH group is ortho or para to the sulfur atom, the R substituents may be the same or different and are each alkyl radicals of 1 to 4 carbon atoms and $n$ is an integer of 2 or 3.

2. A polyamide as claimed in claim 1 wherein there have been incorporated from 50 to 100 parts per million of said phosphorus.

3. A polyamide according to claim 1 wherein there have been incorporated from 400 to 1000 parts per million of said sulphur-containing phenol.

4. A polyamide as claimed in claim 1 wherein there have been incorporated from 400 to 1000 parts per million of manganese as a light stabilizer.

5. A polyamide as claimed in claim 1 wherein there have been incorporated from 10 to 100 parts per million of manganese as a light stabilizer.

6. A polyamide as claimed in claim 1 wherein hydroxyl groups of the sulphur-containing phenols are located symmetrically on benzene rings in the parapositions to the S atom.

7. A polyamide as claimed in claim 1 wherein the sulphur-containing phenol is bis(2-methyl-4-hydroxy-5-t-butyl phenyl) sulphide.

8. A polyamide as claimed in claim 1 wherein said polyamide is polyhexamethylene adipamide, with or without added pigment.

9. Fibres, filaments, yarns, fibres, fabrics and other textile materials shaped from polyamides as claimed in claim 1.

References Cited

UNITED STATES PATENTS

| | | | |
|---|---|---|---|
| 2,493,597 | 1/1950 | Rothrock et al. | 260—45.7 |
| 2,510,777 | 6/1950 | Gray | 260—45.7 |
| 2,630,421 | 3/1953 | Stamatoff | 260—45.7 |
| 3,026,264 | 3/1962 | Rocklin | 260—45.95 |
| 3,086,960 | 4/1963 | Bletso | 260—45.95 |
| 3,196,185 | 7/1965 | Ranson | 260—45.95 |
| 3,324,071 | 6/1967 | Skoog | 260—37 |

DONALD E. CZAJA, Primary Examiner

V. P. HOKE, Assistant Examiner

U.S. Cl. X.R.

260—37 N, 45.7 P, 45.9 R, 45.95 R